United States Patent
Yu

(10) Patent No.: US 7,057,147 B1
(45) Date of Patent: Jun. 6, 2006

(54) IMAGING SYSTEM AND METHOD FOR COLLECTING ENERGY FROM AT LEAST TWO SENSING ELEMENTS ADJACENT ONE ANOTHER BETWEEN ROWS OF SENSING ELEMENTS

(75) Inventor: Young-June Yu, Cranbury, NJ (US)

(73) Assignee: ITT Manufacturing Enterprises Inc., Wilmington, DE (US)

( * ) Notice: Subject to any disclaimer, the term of this patent is extended or adjusted under 35 U.S.C. 154(b) by 36 days.

(21) Appl. No.: 10/738,390

(22) Filed: Dec. 17, 2003

(51) Int. Cl.
*H01L 27/00* (2006.01)

(52) U.S. Cl. .............. 250/208.1; 250/214 R; 250/214 VT; 313/103 R; 313/105 R

(58) Field of Classification Search .......... 250/207, 250/214 VT, 214 SW, 214 R, 208.1; 313/103 CM, 313/105 CM, 103 R, 105 R, 523–544
See application file for complete search history.

(56) References Cited

U.S. PATENT DOCUMENTS

| | | | |
|---|---|---|---|
| 4,875,093 A * | 10/1989 | Koishi et al. | 348/61 |
| 5,844,238 A | 12/1998 | Sauer et al. | |
| 5,929,449 A * | 7/1999 | Huang | 250/370.09 |
| 5,965,886 A | 10/1999 | Sauer et al. | |
| 5,969,758 A | 10/1999 | Sauer et al. | |
| 6,040,570 A | 3/2000 | Levine et al. | |
| 6,101,294 A | 8/2000 | McCaffrey et al. | |
| 6,249,001 B1 | 6/2001 | Sauer et al. | |
| 6,433,326 B1 | 8/2002 | Levine et al. | |
| 6,441,852 B1 | 8/2002 | Levine et al. | |
| 6,498,347 B1 | 12/2002 | Sauer et al. | |
| 6,646,249 B1 * | 11/2003 | Bird | 250/208.1 |

OTHER PUBLICATIONS

Hod Rinkelstein and Ran Ginosar, "Front-side bombarded metal plated CMOS electron sensors", Solid State Sensor Arrays: Development and Applications II, Jan. 26-27, 1998, 186-197, vol. 3301, San Jose, California.

Data Sheet, Hamamatsu, "Electron Bombardment CCD Cameras C7190", Jun. 2000.

* cited by examiner

*Primary Examiner*—Stephone B. Allen
*Assistant Examiner*—Patrick J. Lee
(74) *Attorney, Agent, or Firm*—RatnerPrestia

(57) ABSTRACT

An imaging device including a plurality of electron sensing elements for receiving energy from an electron energy source is provided. Each of the electron sensing elements includes at least one respective charge collection element configured to receive and store energy from the respective energy sensing element. The imaging device also includes a plurality of switching elements positioned between respective ones of the plurality of energy sensing elements. The imaging device is configured to collect energy received by at least two of the plurality of energy sensing elements in the at least one respective charge collection element of one of the at least two of the plurality of energy sensing elements through actuation of at least one of the switching elements.

18 Claims, 14 Drawing Sheets

IMAGING SYSTEM AND METHOD FOR COLLECTING ENERGY FROM AT LEAST TWO SENSING ELEMENTS ADJACENT ONE ANOTHER BETWEEN ROWS OF SENSING ELEMENTS

FIELD OF THE INVENTION

This invention relates to imaging systems, and more particularly, to electron beam imaging systems including solid-state image sensors.

BACKGROUND OF THE INVENTION

Certain conventional imaging systems (e.g., night vision systems) receive energy (e.g., in the form of light) using a photocathode that converts the energy into electrons. The electrons are then transmitted to a micro-channel plate device (i.e., MCP) that multiplies and accelerates the electrons. The electrons are then transmitted to an imaging device (e.g., CMOS device, CCD device, etc.). The imaging device includes sensor elements (e.g., pixels) for sensing the electrons and converting the electrons into an analog image. The analog image, which may be converted into a digital image, is then ready for transmission to a display device.

In converting the electron energy into an analog image within the imaging device, the electron energy is typically stored, converted to a voltage signal, and then scanned in one of a number of ways. For example, scanning methods include rolling shutter scanning and snapshot scanning. Some rolling shutter scans are interlaced. Snapshot scanning sometimes emulates rolling shutter through pseudo-interlace scanning.

For example, in electron beam (i.e., e-beam) sensing applications utilizing CMOS sensor arrays it may be desirable to use snapshot scanning because the MCP operates in a "pulse mode" by turning on and off the supply voltage. Through this pulsing operation, the lifetime of the imager may be increased. If conventional rolling shutter mode scanning operation is utilized in such a pulse mode (e.g., in a 3T-pixel configuration as illustrated in FIG. 14a) the integration time varies line by line. This is because the integration time of the entire pixel array is not synchronized. Rather, the integration time of the pixel array is staggered line by line. As such, certain pixels in a given line of the array may have full integration time, while other pixels have substantially less integration time (i.e., because the MCP is turned off during the integration time interval).

To overcome this non-uniformity problem related to the integration time in rolling shutter mode scanning, snapshot pixel scanning may be employed having synchronized integration time. For example, FIG. 14b illustrates a typical 5-transistor architecture of an electron beam sensing snapshot CMOS active pixel array. However, many conventional snapshot pixels are structured such that they are more suitable for progressive scanning readout. Depending on the application, interlace-scanning readout may be preferred to the progressive scanning readout for a number of reasons. For example, the interlace-scanning readout is suitable for taking moving pictures since it offers a relatively fast readout speed by having two snapshots per frame. Additionally, interlace-scanning readout offers compatibility with conventional NTSC/PAL format video signals.

By operating conventional snapshot pixel systems in the interlace scanning mode (which provides readouts twice by splitting the frame into odd and even fields) nothing is gained in terms of speed because the snapshot in the pixel array occurs once per frame even if the readout takes place twice per frame. Another drawback is that the interlace mode operation reduces the integration time by one half, resulting in a reduction in the dynamic range and yielding a poor signal to noise ratio.

As such, it would be desirable to provide an imaging system including an imaging device to overcome one or more of the above-recited deficiencies.

SUMMARY OF THE INVENTION

According to an exemplary embodiment of the present invention, an imaging device including a plurality of electron sensing elements for receiving energy from an electron energy source is provided. Each of the electron sensing elements includes at least one respective charge collection element configured to receive and store energy from the respective energy sensing element. The imaging device also includes a plurality of switching elements positioned between respective ones of the plurality of energy sensing elements. The imaging device is configured to collect energy received by at least two of the plurality of energy sensing elements in the at least one respective charge collection element of one of the at least two of the plurality of energy sensing elements through actuation of at least one of the switching elements.

According to another exemplary embodiment of the present invention, an imaging system is provided. The imaging system includes a photocathode for receiving energy from an energy source, and for converting the received energy into electrons. The imaging system also includes a micro-channel plate for receiving the electrons from the photocathode and for multiplying and accelerating the electrons received from the photocathode. The imaging system also includes an imaging device for receiving electrons from the multi-channel plate. The imaging device includes a plurality of electron sensing elements for receiving a portion of the electrons from the multi-channel plate, where each of the electron sensing elements includes at least one respective charge collection element configured to receive and store energy from the respective energy sensing element. The imaging device also includes a plurality of switching elements positioned between respective ones of the plurality of energy sensing elements. The imaging device is configured to collect energy received by at least two of the plurality of energy sensing elements in the at least one respective charge collection element of one of the at least two of the plurality of energy sensing elements through actuation of at least one of the switching elements. The imaging system also includes a display device for receiving and displaying an output image signal from the imaging device. Before being displayed, the output image signal may be converted from an analog signal to a digital signal.

According to yet another exemplary embodiment of the present invention, a method of operating an imaging device is provided. The method includes receiving energy from an electron energy source via a plurality of electron sensing elements. The method also includes providing each of the electron sensing elements with at least one respective charge collection element configured to receive and store energy from the respective electron sensing element. The method also includes operating a plurality of switching elements positioned between respective ones of the plurality of energy sensing elements such that energy received by at least two of the plurality of energy sensing elements is collected in the at least one respective charge collection element of one of the at least two of the plurality of energy sensing elements through the operating step.

BRIEF DESCRIPTION OF THE DRAWINGS

Exemplary embodiments of the invention will be described with reference to the drawings, of which.

DETAILED DESCRIPTION OF THE INVENTION

The present invention relates to an electron beam sensing CMOS pixel and readout architecture suitable for snapshot and pseudo-interlace scan readout based on a signal charge summation of two neighboring pixels, and a corresponding driving method, to realize a high dynamic range, high speed readout, and low noise performance. The improved dynamic range performance is accomplished by utilizing a new pixel structure that is suitable, for example, for pseudo-interlace mode operation. More specifically, the improvement in dynamic range results from the summation of the signal of two neighboring pixels. Conventional interlace mode operation does not utilize the pixel signal summation scheme disclosed herein.

Figure 1:
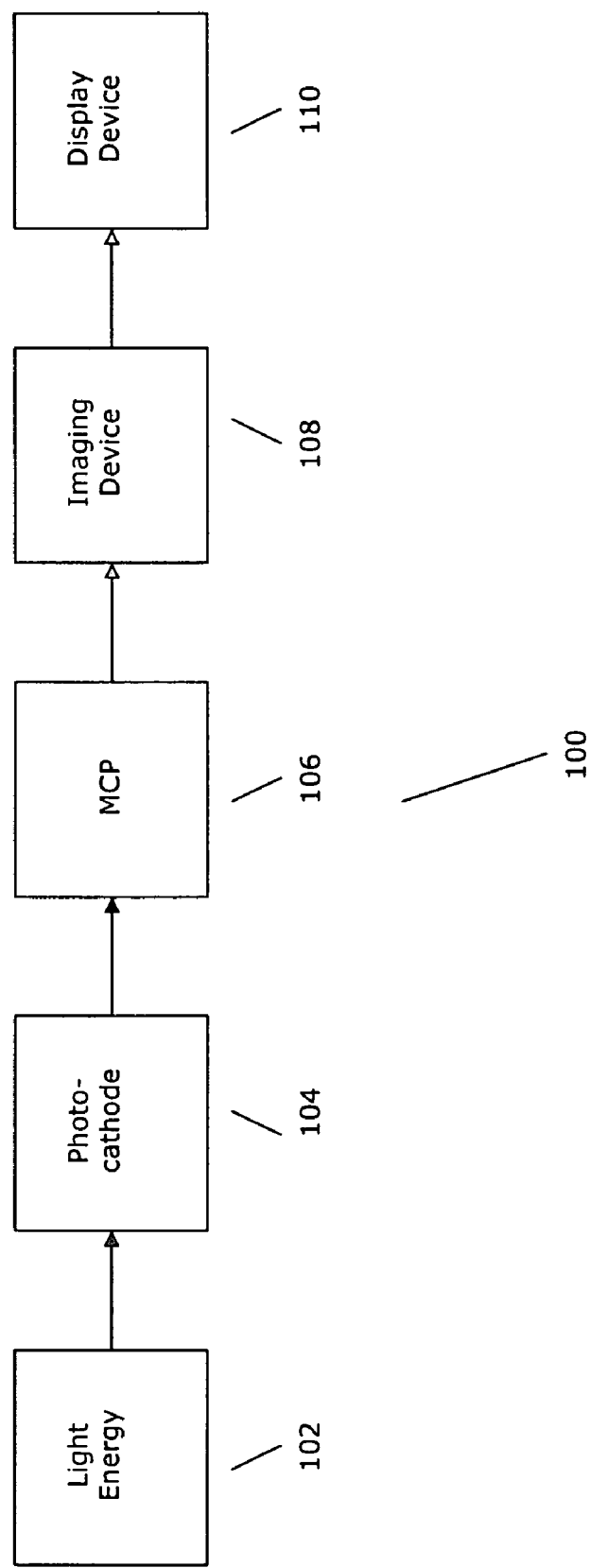
FIG. 1 is a block diagram of an imaging system in accordance with an exemplary embodiment of the present invention.

FIG. 1 is a block diagram of an imaging system in accordance with an exemplary embodiment of the present invention. Energy 102 (e.g., light energy) is received by photocathode 104. Energy 102 may be, for example, ambient light energy or infrared energy received by photocathode 104. Photocathode 104 converts the received energy into electrons. The electrons are then transmitted to multi-channel plate device 106 (i.e., MCP), where the electrons are multiplied and accelerated. The electrons are then transmitted to imaging device 108 (e.g., a CMOS device). As discussed herein, imaging device 108 receives electron energy from an electron energy source. In the block diagram illustrated in FIG. 1, MCP 106 (or the combination of light energy 102, photocathode 104, and MCP 106) may be considered to be an electron energy source.

As detailed in the various exemplary embodiments disclosed herein, imaging device 108 includes sensor elements (e.g., pixels) for sensing the electrons and converting the electrons into an image signal (e.g., an analog image signal). The image signal, which may be converted to a digital image signal, is transmitted to display device 110.

Figure 2:
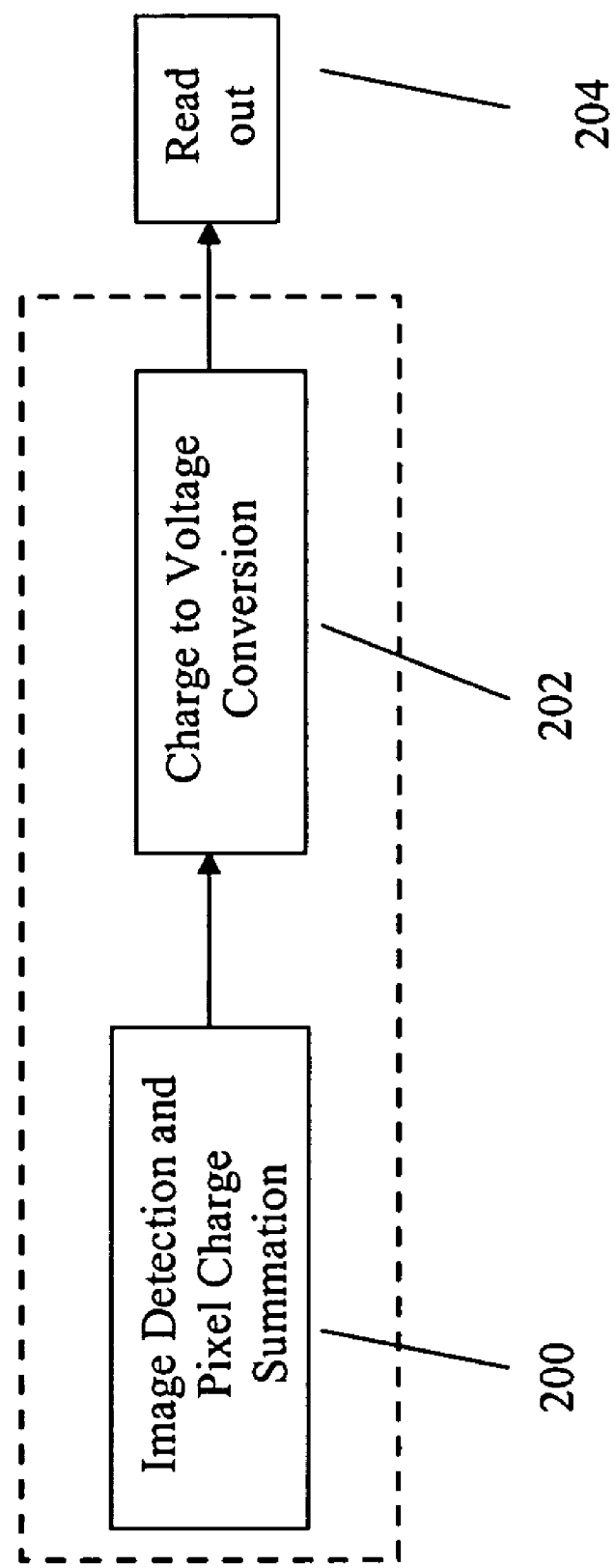
FIG. 2 is a flow diagram in accordance with an exemplary embodiment of the present invention.

FIG. 2 is a flow diagram illustrating a method of improving the signal to noise ratio in an imaging device (e.g., imaging device 108 in FIG. 1). At block 200, electron energy is detected by the imaging device (e.g., more particularly the electron sensing elements such as pixels in the imaging device), and the charge of adjacent pixels in the imaging device is summed in a charge collection element of one of the pixels, as will be explained in greater detail below. At block 202, the charge stored in each of the charge collection elements is converted to a corresponding voltage signal. At step 204, the voltage signals are scanned. As illustrated by the dotted lines in FIG. 2, the image detection, charge summation, and charge to voltage conversion are all accomplished in the imaging device (e.g., in the pixel structure). This is in direct contrast to prior art summation techniques where the signals are summed after red-out, prior to the introduction of noise from the active pixel elements.

Figure 3:
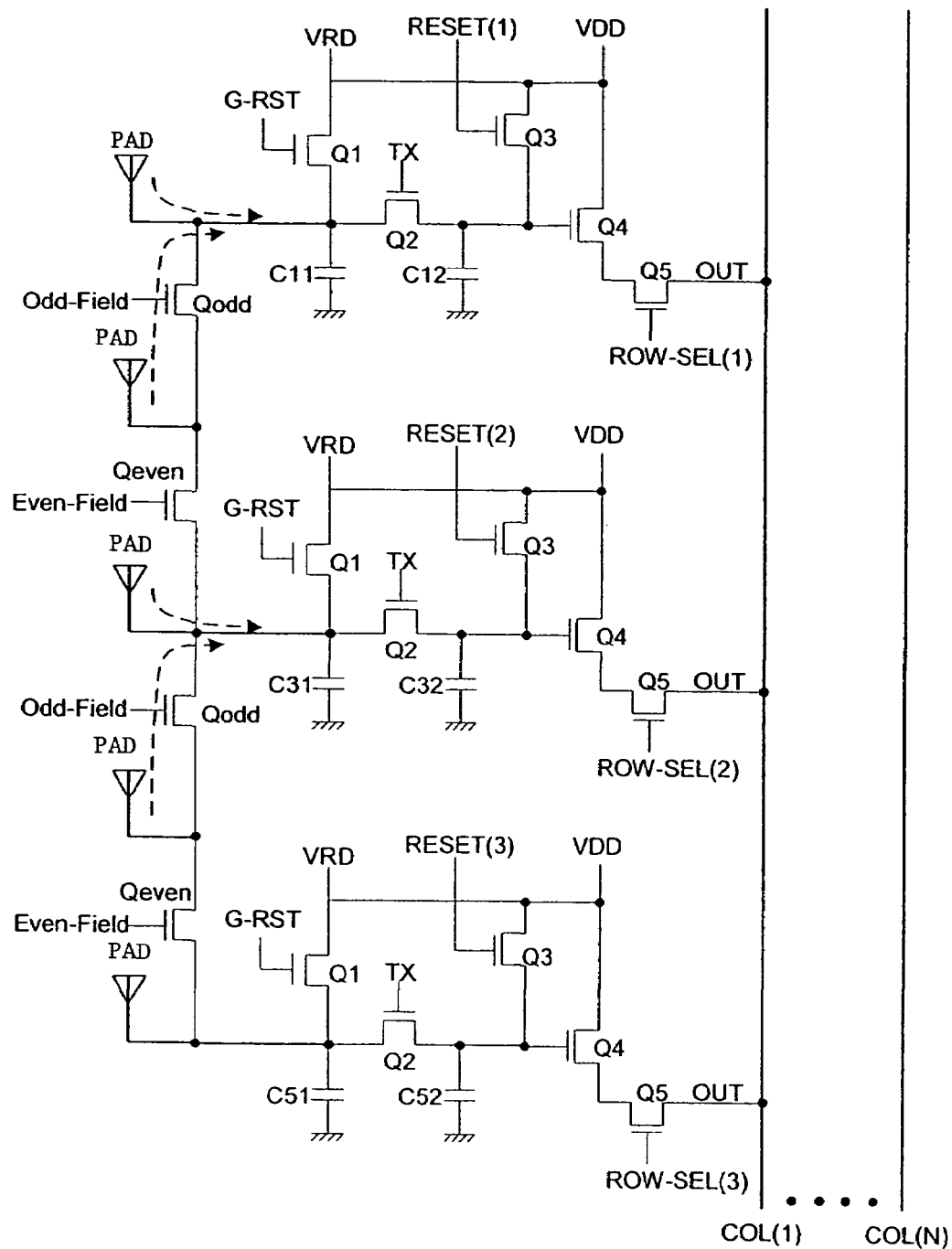
FIG. 3 is an illustration of a pixel array for pseudo-interlace readout in accordance with an exemplary embodiment of the present invention.

FIG. 3 is an illustration of a portion of a pixel array (i.e., an imaging device) for pseudo-interlace readout in accordance with an exemplary embodiment of the present invention. In FIG. 3, three pixel structures are illustrated in column 1, however, it is clear that additional pixel structures may be, and preferably are, included in column 1. Additionally, a plurality of columns are provided, as symbolized the "COL(1). . . . COL (N)" notation. As such, a number of rows and columns of pixel elements are provided to form a pixel array.

Generally speaking, FIG. 3 illustrates, in each pixel, a sensing pad/plate, two capacitors (C11 and C12 for pixel 1, C31 and C32 for pixel 3, and C51 and C52 for pixel 5), two reset transistors (G-RST/Q1 and RESET(1)/Q3 for pixel 1, G-RST/Q1 and RESET(2)/Q3 for pixel 3, and G-RST/Q1 and RESET(3)/Q3 for pixel 5), and two transistors (i.e., Q4 and Q5) for the readout source follower. In addition, one transistor (e.g., Qodd and Qeven) is located between each pair of neighboring pixels.

More specifically, the antenna symbols provided along the left side of FIG. 3 are sensing pads (e.g., electron sensing metal pads or an e-beam collecting metal plate) included in each pixel. Qodd is a transistor switch (i.e., a switching element) which provides for summation of the signals between two antennas in row #1 and row #2 in the odd fields. Likewise, Qeven is a transistor switch which provides for summation of the signals between two antennas in row #2 and row #3 in the even fields. G-RST and Q1 represent a global reset switch which ensures that the collection capacitor holds a zero signal at the beginning of a cycle. VRD represents the voltage to which each pixel is set. TX and Q2 represent a transistor switch which transmits charge from the collection capacitor to the storage capacitor. RESET and Q3 represent a transistor switch which ensures that the storage capacitor holds zero signal at the beginning of a cycle. VDD is the power to the source follower and to the storage capacitors. Q4 is the source follower that converts the charge signal to a voltage signal. Q5 and ROW-SEL enable each pixel to be read to a column video signal. C11, C21, and C31 are collection capacitors for pixels 1, 3, and 5, respectively. C12, C32, and C52 are storage capacitors for pixels 1, 3, and 5, respectively.

In the two-dimensional array, each e-beam collecting plate is required in each pixel position. However, only half of the number of pixel circuits (e.g., CMOS pixel circuits) may be used in this configuration to implement the pseudo-interlace readout. If it is desired to operate the image sensor in a dual mode (i.e., both progressive-scan mode and pseudo-interlace mode), the configuration illustrated in FIG. 4 may be utilized.

Figure 5:
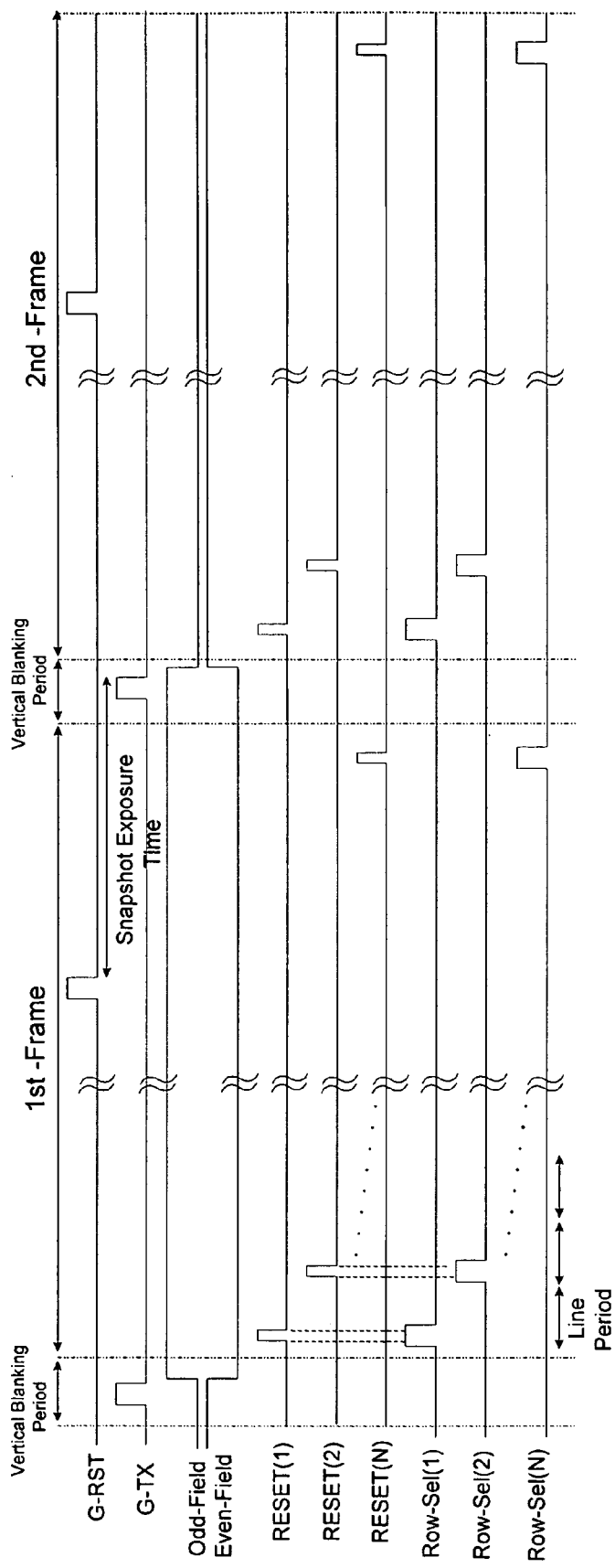
FIG. 5 is a timing diagram for operation of a pixel array for pseudo-interlace readout in accordance with an exemplary embodiment of the present invention.

FIG. 5 is a timing diagram for operation of a pixel array (e.g., such as the array illustrated in FIG. 3) for pseudo-interlace readout in accordance with an exemplary embodiment of the present invention. Generally speaking, FIG. 5 illustrates the "odd" field of a pseudo interlaced frame where the odd transistor switch in FIG. 3 is closed and when the even switch is opened. The signal is collected in a period shown as "Snapshot Exposure Time." FIG. 5 also illustrates the even field of a pseudo interlace frame where the diagram is labeled 2nd frame. The odd field transistor is then opened and the even field transistor is closed. The other signals illustrated in FIG. 5 are support signals for properly clocking the image. During the imaging cycle, the odd field and the even field may be repeatedly alternated in a pseudo-interlace operation.

More specifically, in FIG. 5, to read out the first field signal, the Qodd transistors are turned on with the Qeven transistors off. At the beginning of the integration time, the G-RST (i.e., the global reset) is asserted 'High'. Collecting node A is then pre-charged to the VRD level. Since the antenna and the summation transistor (i.e., Qodd, Qeven) may have parasitic capacitance, VRD resets this parasitic capacitance as well as C11. As soon as the G-RST becomes 'Low', the integration starts, and the charges collected by the two antennas in row #1 and row #2 are combined and transferred to the collecting capacitor (e.g., C11, C31, C51, etc.).

The end of the integration time is determined by the issuance of the TX enable pulse. With TX 'High', part of the integrated charge in C11 is transferred to C12 by sharing the charges between the two capacitors. When the Q2 is disabled at the falling edge of the TX pulse, the signal charge is sampled in C12 and isolated until the next reset is provided by Q3. This is called the snapshot, and it occurs to the entire pixel array at the same time. The stored charge is readout row by row by asserting the Row-Sel signals.

To read out the even field, Qodd is then turned off with Qeven turned on. This results in a different charge summation such that row #2 and row #3, as well as row #4 and row #5, are combined. The remainder of the operation is as described above with respect to read-out of the first field (i.e., the odd field).

Figure 4:
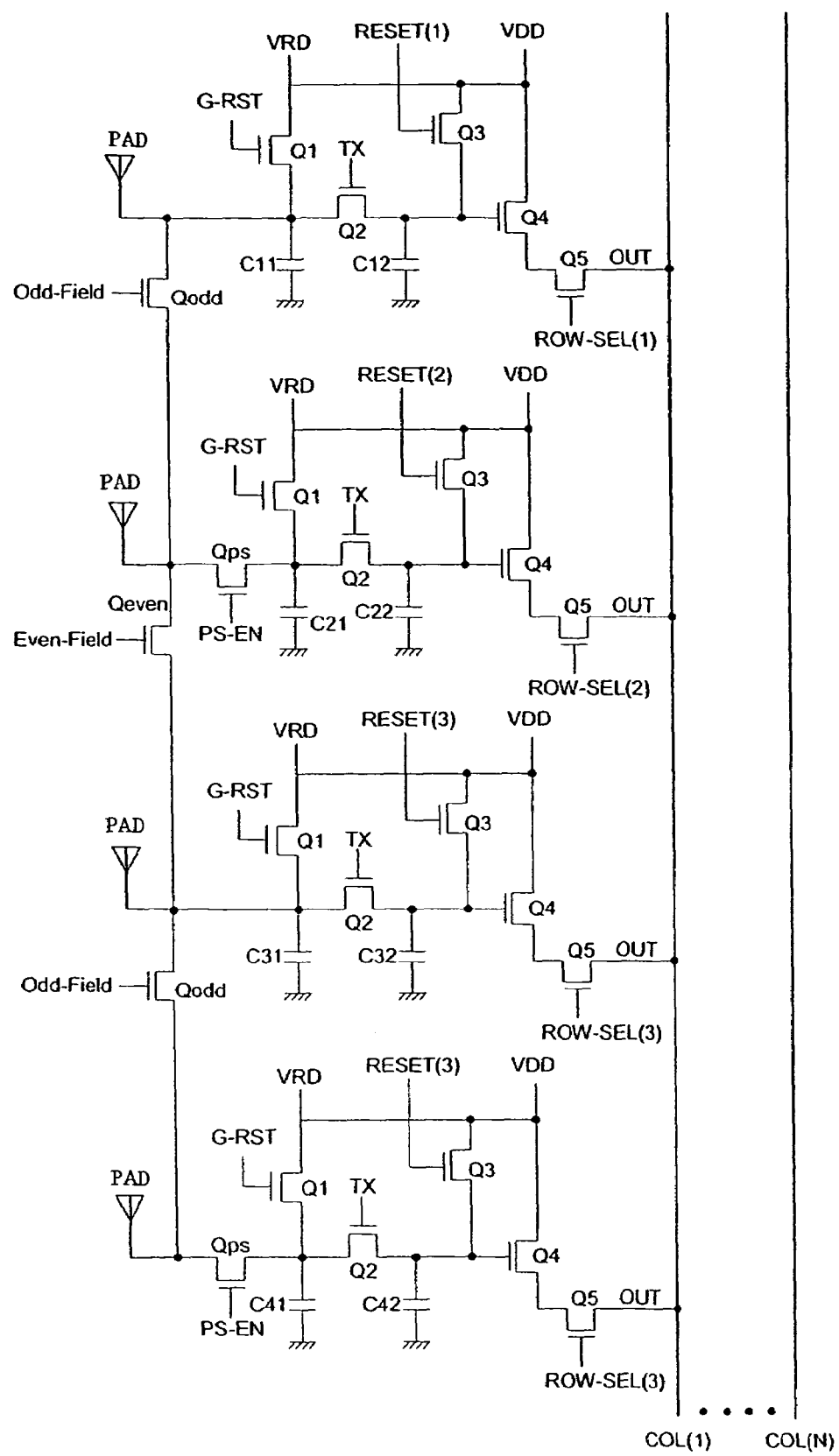
FIG. 4 is an illustration of another pixel array in accordance with an exemplary embodiment of the present invention.

As indicated above, FIG. 4 illustrates the configuration of a dual mode readout. Such an operation is the same as described above with respect to FIGS. 3 and 5, except that the switching transistors are provided with dual mode control capability. More specifically, PS-EN and Qps represent the transistor switch that enables the imaging system to be operated in progressive scan mode. By turning on the Qps transistor with Qodd off and Qeven off, the pixel array becomes equivalent to a conventional pixel array for use in a progressive scan mode.

Conversely, when Qps in FIG. 4 is turned off, the pixel array can operate in the pseudo-interlace mode. Pixels in the even numbered rows (i.e., row #2, row #4, etc.) are disabled by not issuing the Row-SEL pulse and the RESET for the row.

To switch back and forth between the two different readout modes provided for in FIG. 4, additional controls are utilized for the vertical address decoder and the pulse driver to issue the appropriate sets of pulses for the pixel array.

Figure 6:
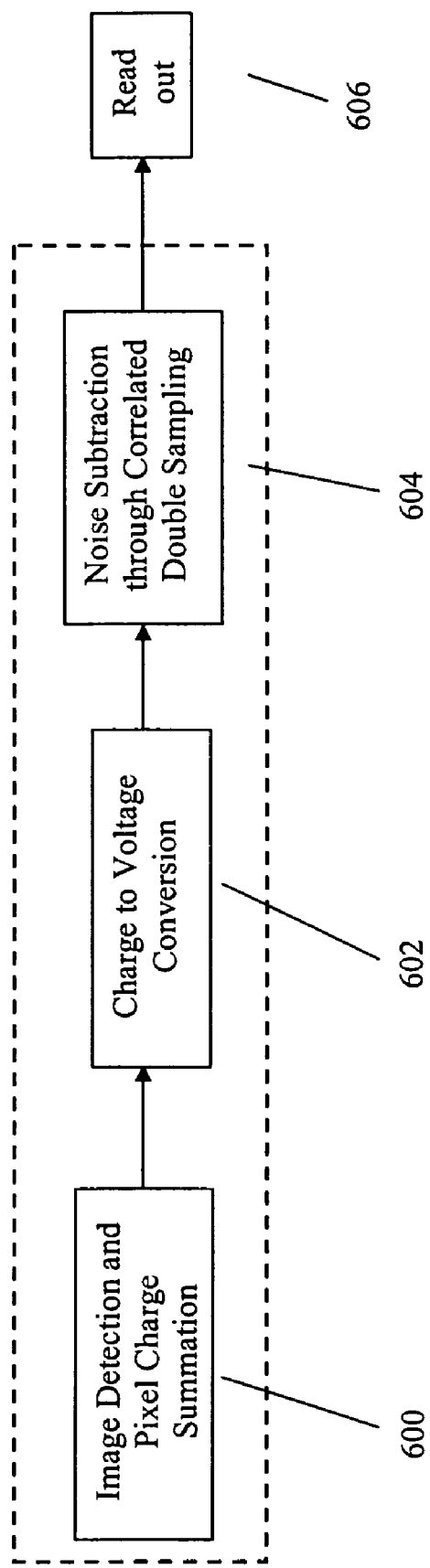
FIG. 6 is a flow diagram in accordance with an exemplary embodiment of the present invention.

FIG. 6 is a flow diagram illustrating a method of improving the signal to noise ratio in an imaging device (e.g., imaging device 108 in FIG. 1) utilizing correlated double sampling. At block 600, electron energy is detected by the imaging device (e.g., the pixels), and the charge of adjacent pixels is summed in a charge collection element of one of the pixels. At block 602, the charge stored in each of the charge collection elements is converted to a voltage signal. At step 604, noise is subtracted from the voltage signal utilizing correlated double sampling, as will be explained herein. By subtracting the noise after the charge to voltage conversion at step 604, the signal to noise ratio is improved. At step 606, the voltage signals are scanned. As illustrated by the dotted lines in FIG. 6, the image detection, charge summation, charge to voltage conversion, and noise subtraction are all accomplished in the imaging device (e.g., in the pixel structure). This is in direct contrast to prior art noise subtraction techniques where the noise subtraction is accomplished after read-out.

Figure 7:
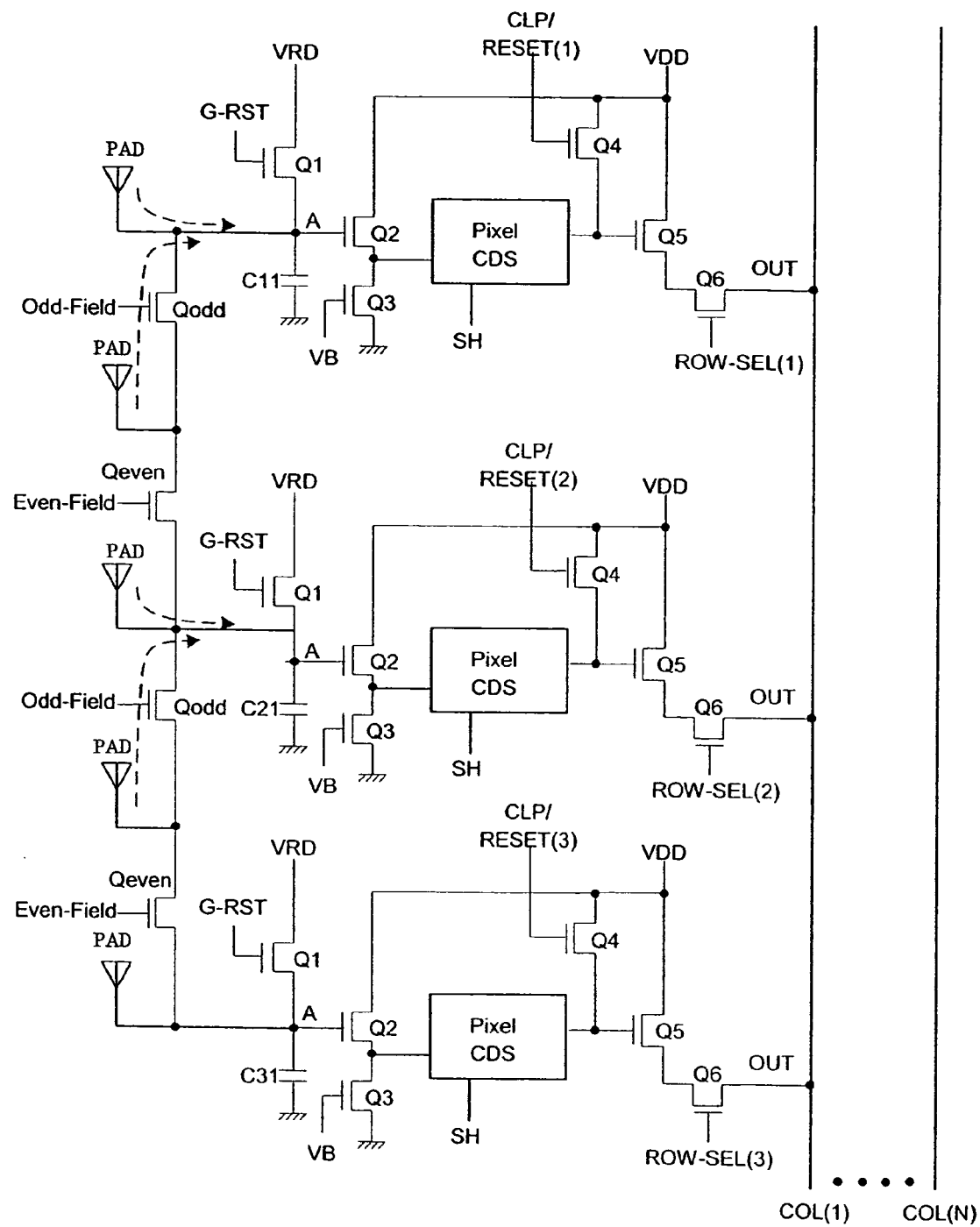
FIG. 7 is an illustration of a pixel array for pseudo-interlace readout with correlated double sampling in accordance with an exemplary embodiment of the present invention.

The pixel array (i.e., the 5T-based pixel) described above with respect to FIG. 3 has a potential drawback in that the dynamic range of the signal is reduced due to the charge sharing between two capacitors in the pixel when the TX is asserted. The reduction factor is ½ if two capacitors are assumed to be equal. To overcome this potential problem, according to an exemplary embodiment of the present invention, a new pixel configuration is illustrated in FIG. 7. In this pixel configuration, an additional source follower (SF) and a pixel CDS are included in each pixel element. Some examples of the pixel CDS are shown in FIG. 8a and FIG. 8b, and the driving method of the pixel array is shown in FIG. 9 and described below.

As provided above, FIG. 7 is an illustration of a pixel array for pseudo-interlace readout with correlated double sampling in accordance with an exemplary embodiment of the present invention. Descriptions of various features of the array illustrated in FIG. 7 that are similar to the features previously described with respect to FIG. 3 are substantially omitted herein. In FIG. 7, Q2, Q3, and VB represent the source follower utilized to convert charge signals to voltage signals, and also acts as a switch to transfer signals to the pixel CDS. RESET and Q4 represent the transistor switch which ensures that the storage capacitor holds zero signal at the beginning of a cycle. CDS is a correlated double sampling circuit which subtracts imager noise from a received signal. SH represents sample and hold for the CDS samples, whereby the pixel output is held during the noise subtraction. CLP represents a signal that clamps the offset of the signal to a fixed voltage at the beginning of a cycle, and partakes in the pixel reset when clocked in conjunction with the Vbias signal.

Figure 8A:
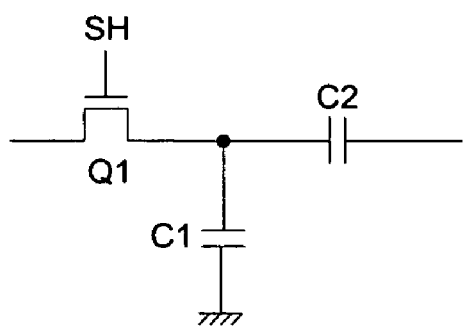
FIG. 8a is an illustration of a correlated double sampling pixel in accordance with an exemplary embodiment of the present invention.
Figure 8B:
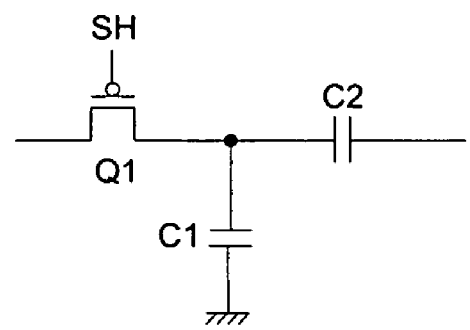
FIG. 8b is an illustration of a correlated double sampling pixel in accordance with another exemplary embodiment of the present invention.

FIGS. 8a and 8b are illustrations of exemplary correlated double sampling pixels in accordance with the present invention. More specifically, FIGS. 8a and 8b are more detailed examples of the elements marked as "Pixel CDS" in FIG. 7, including the SH function (i.e., sample and hold function).

Figure 9:
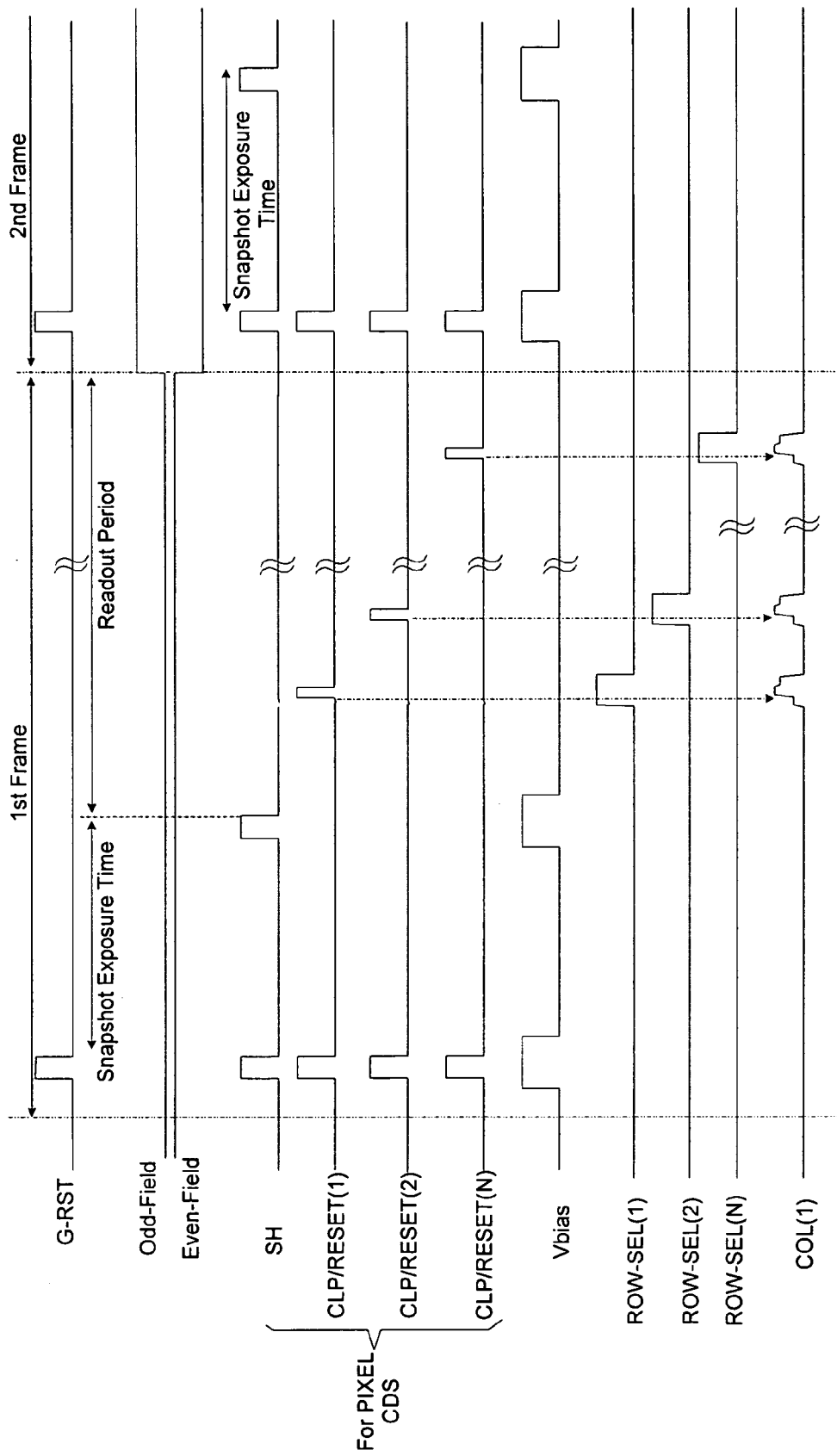
FIG. 9 is a timing diagram for operation of a pixel with single correlated double sampling in accordance with an exemplary embodiment of the present invention.

FIG. 9 is a timing diagram for operation of a pseudo-interlaced pixel with single correlated double sampling in accordance with an exemplary embodiment of the present invention. The "SH" signal sets the CDS for operation. The CLP signal serves two functions. One function is to clamp the offset of the signal to a fixed voltage at the beginning of a cycle, with the result appearing on the "COL" line. A second function is to partake in the pixel reset when clocked in conjunction with the Vbias signal.

By having the additional SF in the pixel array illustrated in FIG. 7, the charges integrated during the snapshot exposure are converted into a voltage signal, avoiding the charge sharing problem described above. Although adding a SF does introduce some signal reduction (e.g., by a factor of 0.8 to 0.9 due to the SF gain), the overall dynamic range is improved. The purpose of having the pixel CDS is to cancel the offset and reset noise associated with the first stage SF and charge collecting capacitor, respectively. The operation of the pixel CDS is as follows. At the beginning, the G-RST resets the voltage at node A (See FIG. 7) to VRD. The exposure is initiated when the G-RST is turned off. At this moment, the reset level is readout by the SF when the VB is 'High', and sampled by the CLP/RESET and stored in the CDS capacitor. Note that in this operation, the CLP/RESET functions as the CLP, a global signal for all of the pixels in the array. After the exposure is completed, the integrated signal is readout by the SF and sampled again by the SH signal. The CDS retrieves the difference between the two signals, thus canceling the correlated reset noise and offset.

The pixel signal output is readout in two steps. First, by issuing the ROW-SEL signal, the second stage SF is enabled and the CDS output is readout. Second, the CLP/RESET follows to reset the gate node of the second stage SF. By resetting the SF gate, the offset cancellation of the second stage SF is processed in the readout circuitry at each column of the array. In this reset operation, the CLP/RESET of the CDS functions as the RESET that is issued row by row.

A potential drawback to the pixel array described above with respect to FIGS. 7–9 is that the snapshot exposure and row-by-row pixel readout can not happen at the same time, because the signal stored in the pixel CDS is destroyed by the readout. For proper operation of the CDS, the readout waits until the exposure is complete.

Figure 10:
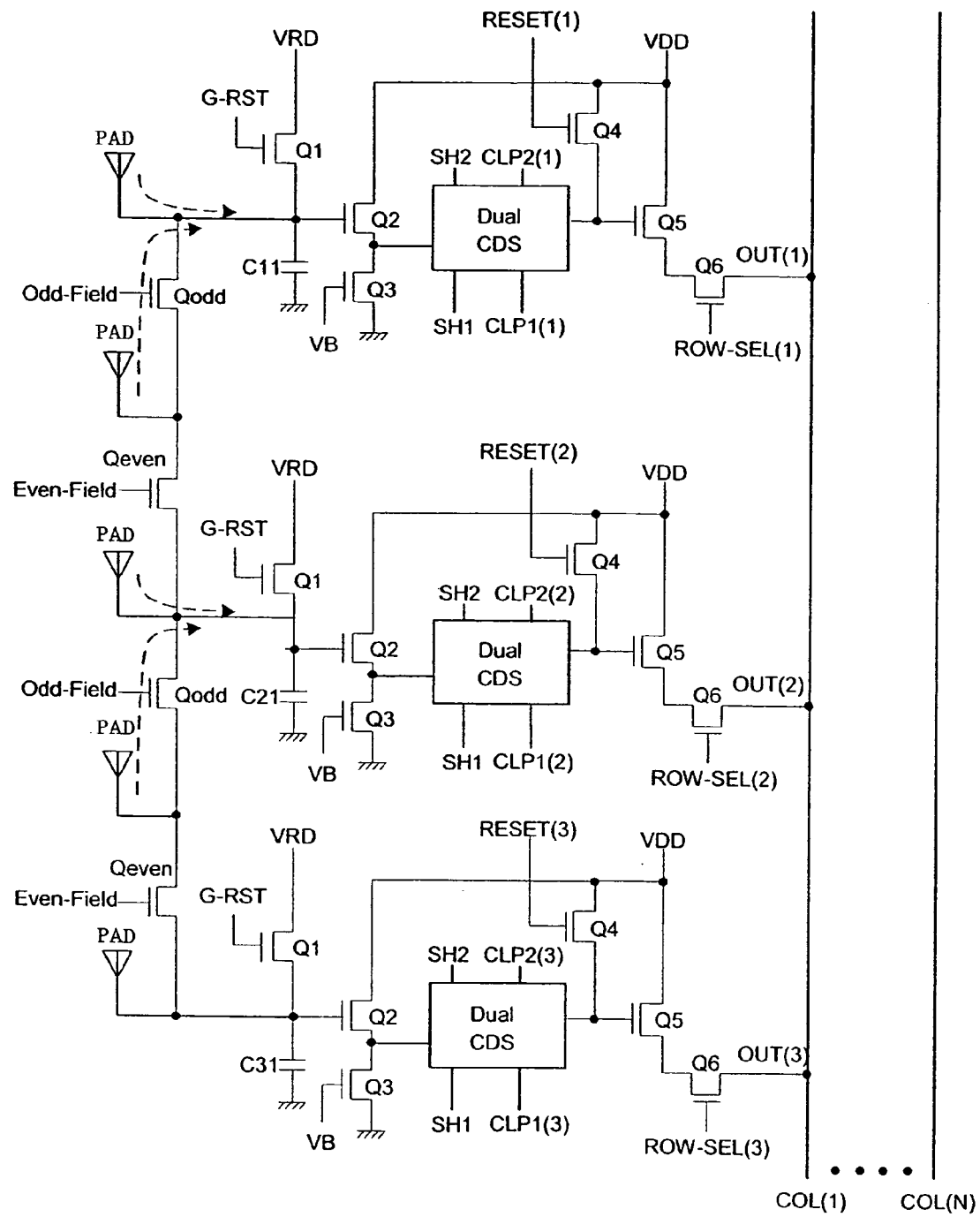
FIG. 10 is an illustration of a pixel array with dual correlated double sampling in accordance with an exemplary embodiment of the present invention.

To circumvent this potential shortcoming, a new pixel array with a Dual CDS configuration is illustrated in FIG. 10. The operation of the pixel array is similar to the operation described above with respect to FIGS. 7–9. A difference is that while one CDS is used for sampling the signals during exposure, the other CDS containing signals corresponding to the exposure from the previous frame is readout. Thus, having two independent CDS elements avoids the conflict between the exposure and pixel readout.

Figure 11A:
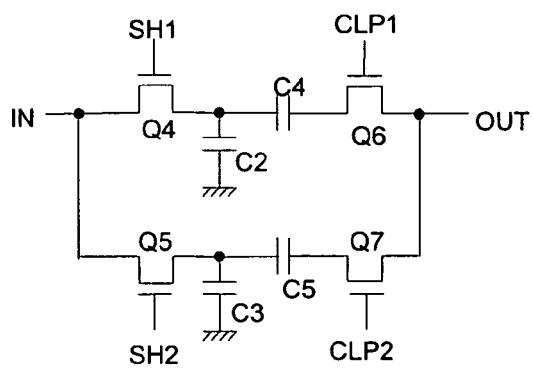
FIG. 11a is an illustration of a dual correlated double sampling pixel in accordance with an exemplary embodiment of the present invention.
Figure 11B:
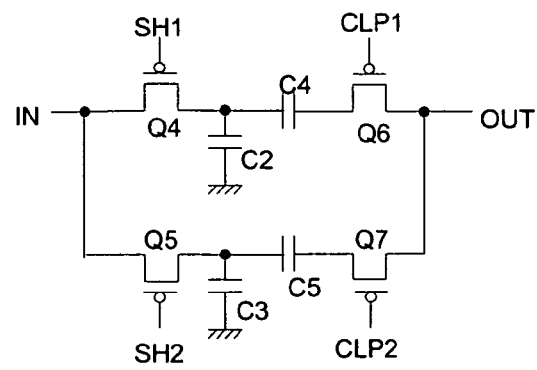
FIG. 11b is an illustration of a dual correlated double sampling pixel in accordance with another exemplary embodiment of the present invention.

FIGS. 11a and 11b are illustrations of exemplary dual correlated double sampling pixels in accordance with the present invention. More specifically, FIGS. 11a and 11b are more detailed examples of the elements marked as "Dual CDS" in FIG. 10, including the SH function (i.e., sample and hold function) and the CLP function.

Figure 12:
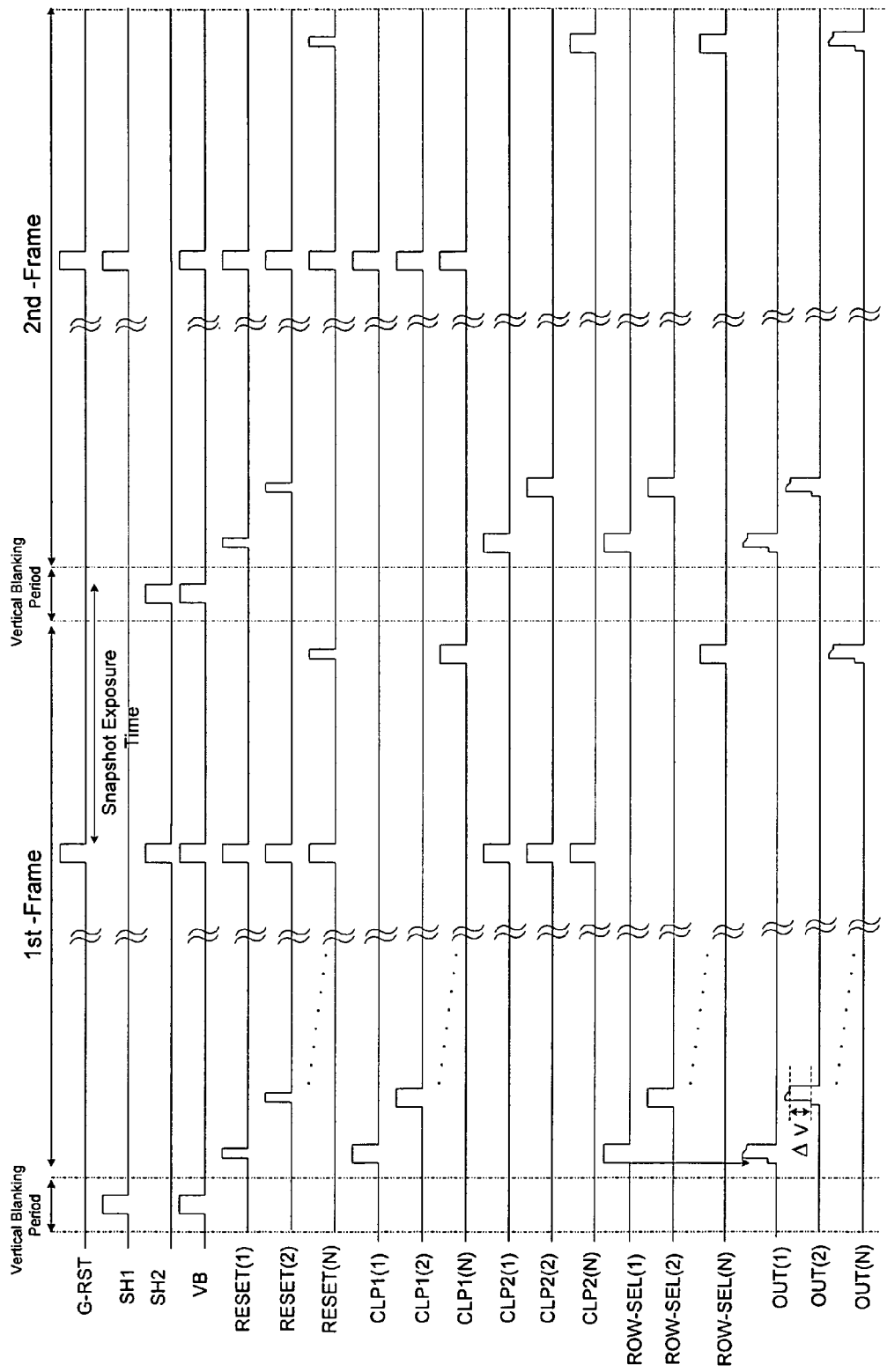
FIG. 12 is a timing diagram for operation of a pixel with dual correlated double sampling in accordance with an exemplary embodiment of the present invention.

FIG. 12 is a timing diagram for operation of a pseudo-interlaced pixel with dual correlated double sampling in accordance with an exemplary embodiment of the present invention. The SH signals set the Dual CDS for operation, and as described with respect to FIG. 9, the CLP signal serves two functions. One function is to clamp the offset of the signal to a fixed voltage at the beginning of a cycle, with the result appearing on the COL line. A second function is to partake in the pixel reset when clocked in conjunction with the Vbias signal. CLP2 clocks the sampled signal from the first CDS to the second CDS.

Figure 13:
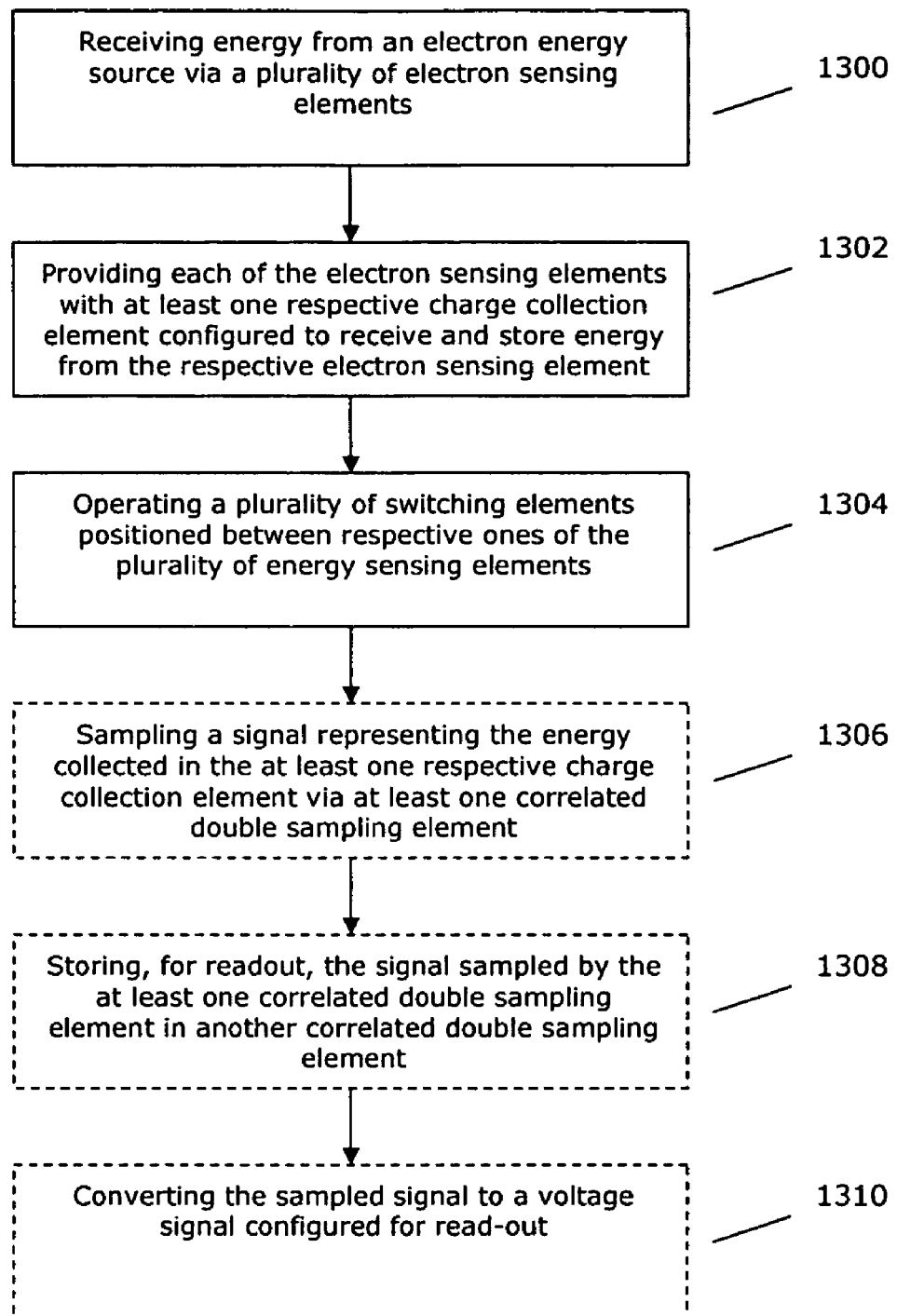
FIG. 13 is a flow diagram illustrating a method of operating an imaging device in accordance with an exemplary embodiment of the present invention.
Figure 14A:
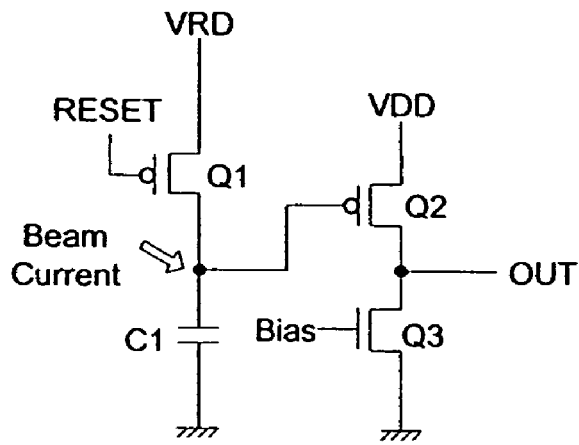
FIG. 14a is an illustration of a conventional 3-transistor architecture of an electron beam sensing CMOS active pixel.
Figure 14B:
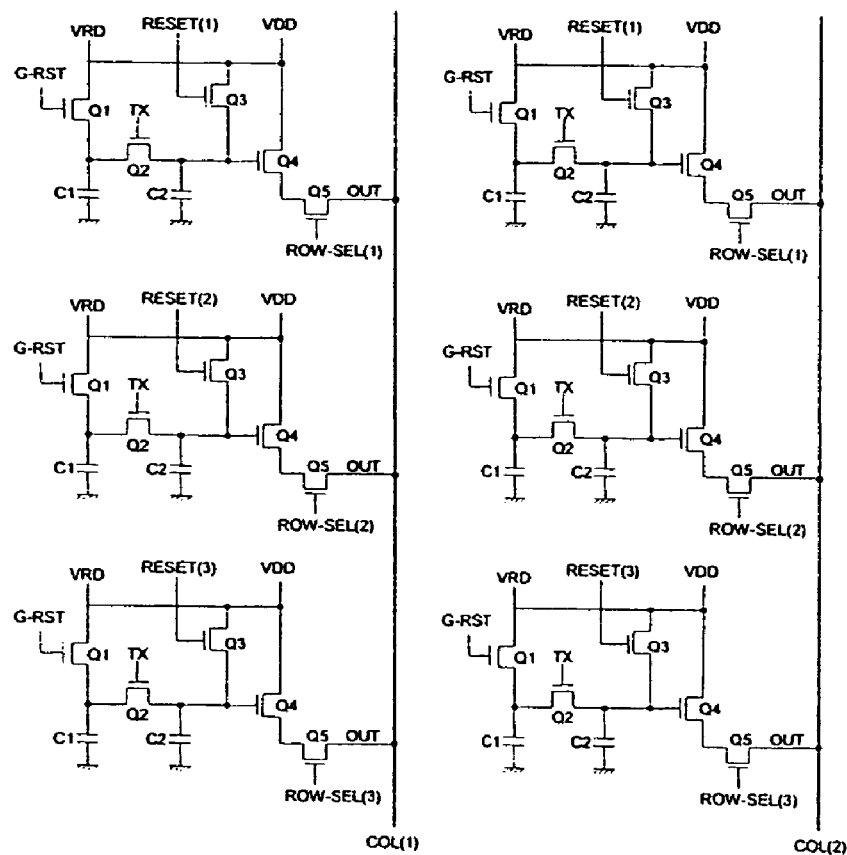
FIG. 14b is an illustration of a conventional 5-transistor architecture of an electron beam sensing snapshot CMOS active pixel.

FIG. 13 is a flow diagram illustrating a method of operating an imaging device in accordance with an exemplary embodiment of the present invention. At step 1300, energy (e.g., light energy) is received from an energy source via a plurality of electron sensing elements. At step 1302, each of the electron sensing elements is provided with at least one respective charge collection element configured to receive and store energy from the respective electron sensing element. At step 1304, a plurality of switching elements positioned between respective ones of the plurality of energy sensing elements are operated such that energy received by at least two of the plurality of energy sensing elements is collected in the at least one respective charge collection element of one of the at least two of the plurality of energy sensing elements. At optional step 1306, a signal representing the energy collected in the at least one respective charge collection element is sampled via at least one correlated double sampling element to remove noise from the energy collected in said at least one respective charge collection element. At optional step 1308, the signal sampled by the at least one correlated double sampling element is stored, for read-out, in another correlated double sampling element, while the at least one correlated double sampling element is utilized to sample another signal representing the energy collected in the at least one respective charge collection element during a subsequent exposure. At optional step 1310, the sampled signal is converted to a voltage signal configured for read-out.

The present invention provides an imaging system with an improved signal to noise ratio. More specifically, because of the summation techniques disclosed herein, the signal strength is increased, while the noise level (largely caused by switching operations) substantially remains the same. Further, because of the signal summation, slower clock rates may be utilized, allowing for a lower noise level.

The present invention also provides an imaging system with an improved dynamic range. More specifically, because of the signal summation, the read out circuitry utilized (e.g., FETs, substrate, etc.) may be reduced by approximately fifty percent, because one set of read out circuitry may be used for two pixel elements. This reduction in read out circuitry opens up valuable real estate in the imaging device, and provides for a larger charge collection element (e.g., a charge collection capacitor). Through this increased charge storage capacity, the dynamic range is improved.

The present invention is applicable to a variety if imaging applications. Exemplary imaging applications include night vision image sensing systems such as fusion systems (e.g., head mounted, platform mounted), image intensified camera systems (e.g., security systems, non-fusion systems), and commercial television applications (e.g., war video, wild life television shows, wild live scientific investigations). Additional exemplary imaging applications include finger print sensing image sensing systems, skin sensing image sensing for cosmetics analysis, image sensing for PCB inspection cameras, and biomedical applications such as DNA analysis sensing systems. Of course, these are simply exemplary imaging system applications, and other imaging systems applications are contemplated within the scope of the present invention.

As described above, the pixel elements of the present invention include a pad/plate for sensing and receiving electrons. The plate of the pixel element may be used as a target where the e-beam bombardment takes place; however, the metal plate can be also used as a micro electrode of a capacitor. If an object is approaching the metal plate, the capacitance between the object and the micro metal plate can be sensed using the pixel, providing capacitive sensing image sensor capability.

Although the switching elements disclosed herein have primarily been discussed by reference to transistors, alternative switching elements are contemplated. Likewise, although the charge collection elements disclosed herein have primarily been discussed by reference to capacitors, alternative charge collection elements (e.g., diodes) are contemplated.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. An imaging device comprising:
   a plurality of electron sensing elements for receiving energy from an electron energy source, each of said electron sensing elements including at least one respective charge collection element configured to receive and store energy from said respective energy sensing element; and
   a plurality of switching elements connected between respective ones of said plurality of energy sensing elements,
   said imaging device configured to collect energy received by at least two of said plurality of energy sensing elements in one respective charge collection element, through actuation of one of said switching elements.

2. The electron sensing imaging system of claim 1 wherein said imaging device is a functional imaging array, and said plurality of energy sensing elements are pixel elements.

3. The electron sensing imaging system of claim 1 wherein said plurality of energy sensing elements are arranged in a plurality of columns and rows, said electron sensing imaging system being configured to collect energy received by at least two of said plurality of energy sensing elements adjacent one another in one of said rows in said at one respective charge collection element through actuation of said one switching elements.

4. The electron sensing imaging system of claim 1 wherein said plurality of energy sensing elements each include a respective electron sensing planar pad.

5. The electron sensing imaging system of claim 1 wherein said plurality of energy sensing elements are pixel elements.

6. The electron sensing imaging system of claim 1 wherein said plurality of switching elements are time cycle controlled transistors.

7. The electron sensing imaging system of claim 1 wherein said plurality of charge collection elements are selected from the group consisting of capacitors and diodes.

8. The electron sensing imaging system of claim 1 wherein said electron sensing imaging system is configured to operate in either of a progressive scan mode and a snapshot pseudo-interlace mode.

9. The electron sensing imaging system of claim 8 wherein said plurality of switching elements includes a first group of switching elements and a second group of switching elements, and operation in said snapshot pseudo-interlace mode includes alternating positions of said first and second groups of switching elements with respect to one another during each of a plurality of cyclical snapshots.

10. The electron sensing imaging system of claim 1 wherein said energy received by said at least two of said plurality of energy sensing elements is collected in said one respective charge collection element before said energy is converted to a voltage signal configured for read-out.

11. The electron sensing imaging system of claim 1 additionally comprising at least one correlated double sampling element configured to sample a signal representing said energy collected in said one respective charge collection element before said energy is converted to a voltage signal configured for read-out, said correlated double sampling element removing noise from said energy collected in said one respective charge collection element.

12. The electron sensing imaging system of claim 11 additionally comprising another correlated double sampling element configured to store, for readout, said signal sampled by said at least one correlated double sampling element, while said at least one correlated double sampling element is utilized to sample another signal representing said energy collected in said at least one respective charge collection element during a subsequent exposure.

13. An imaging system comprising:
   a photocathode for receiving energy from an energy source, said photocathode converting said energy into electrons;
   a multi-channel plate for receiving said electrons from said photocathode and for multiplying and accelerating said electrons received from said photocathode;
   an imaging device for receiving electrons from said multi-channel plate, said imaging device including,
   a plurality of electron sensing elements for receiving a portion of said electrons from said multi-channel plate, each of said electron sensing elements including at least one respective charge collection element configured to receive and store energy from said respective energy sensing element, and
   a plurality of switching elements connected between respective ones of said plurality of energy sensing elements,
   said imaging device configured to collect energy received by at least two of said plurality of energy sensing elements in one respective charge collection element, through actuation of one of said switching elements; and
   a display device for receiving and displaying an output image signal from said imaging device.

14. The imaging system of claim 13 additionally comprising at least one correlated double sampling element configured to sample a signal representing said energy collected in said one respective charge collection element before said energy is converted to a voltage signal configured for read-out, said correlated double sampling element removing noise from said energy collected in said one respective charge collection element.

15. The imaging system of claim 14 additionally comprising another correlated double sampling element configured to store, for readout, said signal sampled by said at least one correlated double sampling element, while said at least one correlated double sampling element is utilized to sample another signal representing said energy collected in said one respective charge collection element during a subsequent exposure.

16. A method of operating an imaging device, said method comprising the steps of:
   receiving energy from an electron energy source via a plurality of electron sensing elements;
   providing each of the electron sensing elements with at least one respective charge collection element configured to receive and store energy from the respective electron sensing element; and
   operating a plurality of switching elements connected between respective ones of the plurality of energy sensing elements such that energy received by at least two of the plurality of energy sensing elements is collected in one respective charge collection element through said operating step.

17. The method of claim 16 further comprising the steps of:
   sampling a signal representing the energy collected in the one respective charge collection element via at least one correlated double sampling element to remove noise from the energy collected in said one respective charge collection element; and
   converting the sampled signal to a voltage signal configured for read-out.

18. The method of claim 17 further comprising the steps of:
   storing, for readout, the signal sampled by the at least one correlated double sampling element in another correlated double sampling element, while the at least one correlated double sampling element is utilized to sample another signal representing the energy collected in the one respective charge collection element during a subsequent exposure.

* * * * *